United States Patent [19]

Maier-Laxhuber

[11] Patent Number: 4,479,364
[45] Date of Patent: Oct. 30, 1984

[54] SORPTION UNITS AND METHODS FOR THEIR OPERATION

[76] Inventor: Peter Maier-Laxhuber, Saumweberstr. 14, 8000 Müchen 60, Fed. Rep. of Germany

[21] Appl. No.: 466,575

[22] Filed: Feb. 15, 1983

[30] Foreign Application Priority Data

Feb. 15, 1982 [DE] Fed. Rep. of Germany ....... 3205285
Mar. 3, 1982 [DE] Fed. Rep. of Germany ....... 3207656

[51] Int. Cl.³ .............................................. F25B 15/00
[52] U.S. Cl. ...................................... 62/141; 62/238.3
[58] Field of Search ................................ 62/238.3, 141

[56] References Cited

U.S. PATENT DOCUMENTS 2,212,869  8/1940  Tornquist ...................... 62/238.3 X
4,337,625  7/1982  Wilkinson ..................... 62/238.3 X
4,368,624  1/1983  Takeshita ........................ 62/238.3

Primary Examiner—Lloyd L. King
Attorney, Agent, or Firm—Charles R. Hoffmann

[57] ABSTRACT

A sorption unit will be equipped with a heat discharge controller (41) that can be monitored/controlled by the consumer (50) in order to make a simultaneous use of the sorption unit as heat pump and heat reservoir possible.

20 Claims, 4 Drawing Figures

SORPTION UNITS AND METHODS FOR THEIR OPERATION

BACKGROUND OF THE INVENTION

This invention involves sorption apparatus and its method of use. The basic thermodynamic principles of sorption units have been known since the last century and have developed from very simple periodically operating refrigerators to the continuously operating absorber-type refrigerators. The recovery of fluorinated hydrocarbons and the resulting progress in compressor technology produced compression-type refrigeration machines after World War II. This completely replaced the periodically operating refrigeration machines and left only a few fields of application for the continuously operating refrigeration machines, i.e. camping refrigerators or cold water coolers. The increasing energy cost resulting from the 1973/1974 energy crisis led to the installation of compression-type refrigeration machines with electric drives for heating systems, similar to the househould-refrigerator type. Since the total efficiency of such heating systems including the efficiency rate of power plants, is higher only in individual cases compared with the efficiency of updated modern conventional heating systems, the idea of continuously operating sorption units with direct primary energy supply (fuel oil, fuel gas, coal) was again utilized. The advantage of continuously operating sorption units lies in the increase of the total performance figure and efficiency which can be reached by eliminating the energy losses of power plants.

Since both systems, the compression-type refrigeration machine and the continuously operating sorption unit, are initially designed for continuous refrigeration, they prove to be unsatisfactory in many respects for use in heating systems.

The basic difference between heat pumps and refrigeration machines is in their field of application. Refrigeration machines are designed for a continous chilling operation at an almost constant cooling level. Since recycling of the waste heat from these types of machines was only planned in exceptional cases, its quantity and temperature were not of interest. This is quite different with heat pumps where the waste heat becomes "useful" heat. At low ambient temperatures, this useful heat should be available at a higher output temperature and in higher quantities. But under those conditions, the temperature of the heat source, which was the chilling temperature for refrigeration machines, is especially low. Therefore, this means that there is a large difference between effective temperature and heat source temperature, when the demand for useful heat is high. In addition, both temperatures are independent of each other and subject to extreme fluctuations not only because of changing weather conditions but also because of consumer behavior. Therefore, generally when there is sufficient heat available from the heat source there is no demand for it and when the heat source is exhausted of available heat it is during a period of increased heat demand. Under these operating conditions, there will be a drastic drop in the performance figures of continuously operating apparatus. The result is a reduced effective heat generation which must be compensated for either by installing additional heat storage capacity and/or switching over to an auxiliary heating system. Due to the low temperature of the heat sources and the continuing need for economic performance figures, the temperature of the useful heat in all present heat pump systems have been restricted to values below 60° C. This restriction has required the installation of low-temperature heating systems, which is only economical in new buildings. This is only possible in exceptional cases in connection with old or reconstructed or renovated buildings.

All available commercial sorption heat pumps are continuously operating units filled with the toxic and inflammable material combination of ammonia/water. The maximum legal allowable ammonia concentration requires certain switching arrangements which are unfavorable for the performance of heat pumps. Other more harmless material combinations used in the sorption refrigeration technology have been found to be too inefficient for use in heat pumps. If one takes into account the high energy consumption for solvent pumps and their additional quite high susceptibility to wear, the performance figures than can be obtained with these machines according to their manufacturers are acceptable. However, during practical use, with low heat source temperatures, fluctuating heat demands or in case of periodic operation, these performance figures cannot be attained. In addition, this type of unit is designed for an average useful heat demand and an additional heat source must be provided for cases of increased heat demand. This produces a doubling of investment costs and floor space because the required auxiliary equipment must be designed for maximum heat demand.

For an optimum utilization of the heat offered by the heat source on one hand and satisfaction of the heat demand as well as during periods where primary energy is available at more economic rates on the other hand, German Pat. No. DE-OS 25 23 429 suggests to store the heat from the heat source in a special heat retaining mass and later on transfer it to a heat reservoir with the aid of a compressor-type heat pump with electric drive, taking advantage of the lower night-tariff rates. Generally, these proposals cannot always be realized. This is due to required large storage capacities and the low temperature of the useful heat together with the necessary temperature difference in the heat exchangers of the heat reservoir. Thus, an effective temperature spreading in the heat retaining mass is almost impossible.

One type of heat reservoir that has been functioning satisfactority for decades is the so-called "Nachtstromwarmespericher" (heat reservoir taking up electrical energy during the night-tariff periods) which is being heated up during the low-tariff periods in the night. Here a heat retaining mass is being heated up to more than 600° C. during low-load/low-tariff periods. The required useful heat will then be taken from the specific heat of the heat-retaining mass during high-tariff periods (days). However, the necessary high storage temperatures will result in extensive heat losses despite thicker insulation layers. A heat pump effect is impossible.

European Pat. No. EP-OS 00 262 557 describes a periodically operating sorption-type heat reservoir with the objective to store the motive energy for the heat pump at sufficiently high temperatures. However, the design of this heat reservoir remains open and storage of heat coming from a heat source is not provided. For a "quasi-continuous operation" the abundant provision of two separate sorption storage units is required.

The objective of all known refrigeration machines is to keep the temperature in the chilling section constant without any external manipulations. But also for units which are designed for waste heat recycling from condensors or boiler absorbers, the cooling temperature controllers are designed for maximum refrigeration.

German Pat. No. DE-PS 596 308 describes a device for hot water preparation by condensation or else adsorption in a periodically operating adsorption-refrigeration unit. However, here the thermostat-controllers let warm water run off unused in order not to impair the chilling effect.

SUMMARY OF THE INVENTION

With the above background in mind, it is a primary objective of the present invention to design a type of sorption unit and to develop methods for its operation which allows it to be used as a heat pump and for heat storage at the same time. The temperature of the heat from a heat source is raised to the higher temperature of useful heat with the aid of the heat pump effect and is also made storage along with the desorption heat required as motive energy for the pump. Discharge of the useful heat is controlled independently of the operating phases of the sorption unit.

It is a further object of the present invention to provide a heating system with a heat-discharge control that can take over the function of conventional filament controls and thus also replace the frequently installed mixing valves. This results in additional simplification and cost-reduction for the installation.

A heat discharge controller is provided and which via an operating/controlling device/element controls the evaporation pressure of the heat exchange medium. This reduces controlling efforts to a minimum. If the sorption medium temperature rises due to sorption, or during the desorption phase by heating up, or else during periods of low heat demand, the liquid level of the heat exchange medium drops due to pressure increase in the heat exchanger unit or even disappears completely. Then the condenser temperature also drops because less work medium vapor enters into the condenser. Because of this, in case of re-starting or increasing heat discharge to the consumer, the pressure in the heat exchanger unit 11 drops until the heat discharge controller again balances the pressure out by refilling the heat exchange medium (of the heat exchanger unit).

The heat exchanger unit 11 is connected to the condenser 20 by means of a vapor line. This provides an advantage in that the useful heat from the boiler adsorber can be transmitted from the condenser to the consumer during the cooling down and sorption phase. An additional heat exchanger at the consumer end as well as a separate controller for the discharge of the useful heat are not required. During the sorption phase, the boiler adsorber will be separated from the condenser.

Since during this phase the sorption pressure is lower than the condenser pressure, a check valve is provided as a shut-off device 13. The installation of a check valve (nonreturn flap) is adequate. However, should during the desorption phase and with uncontrolled desorption heat charging, the pressure inside the boiler adsorber exceed the condenser pressure which is monitored by the heat discharge controller, because there is no demand for heat, a shut-off device 13 must be installed in the vapor line between boiler adsorber 10 and condenser 20. This then overtakes the discharge control for the useful heat.

It is also contemplated that the boiler adsorber consist of more than one identical boiler adsorber unit (10,10a) which can be operated independently. This provides a number of additional advantages. Splitting up the boiler adsorber unit into several boiler adsorber packages/units, allows easy handling and transportation of light and handy units to the place of installation, easy assembly and flexible accomodation to local floor space availability. Also, then if a number of identical standardized component parts, which can be interlocked/combined as desired via vacuum piping, is restricted, every desired storage capacity can be built up step by step by using standard prefabricated boiler adsorber packages. To keep the weight low for easy handling, these boiler adsorber packages can be filled with the sorption medium combination after assembly. It is also advantageous in that if several boiler adsorber units are installed, any desired number of adsorber units can be put on stand-by (or all of them can be shut down) depending upon the actual heat demand at any operating phase of the unit (i.e. during summer times).

It is also contemplated that the present invention employ an adsorption medium combination of zeolite/water. Zeolite-types which are very suitable for this surface are those which have a high water-absorptive capacity together with a high thermal stability at a sufficient vapor pressure reduction. It has been found effective to provide a zeolite of the NA-Y type, at least partially of that type that has undergone an ionic change with magnesium ions. It has also been found effective to provide a zeolite which includes less than 18 wt. % bonding agent or by-products produced by transformation. It is also contemplated that the zeolite be formed into a solid body, provided with flow channels and/or its surfaces geometrically formed to exactly match the heat-exchanging device surfaces 11. The present invention also contemplates the use of atmospheric pressure to tightly press the heat exchanger unit 11 and/or the walls of the boiler adsorber onto the zeolite.

Commercial zeolites come in the form of powder and granulates. Maximum performance figures can be obtained with zeolites with a bonding agent concentration of less than 18 wt. %. The poor thermal conductivity of the zeolite can be improved by pressing the zeolite into solid forms using the lowest possible bonding agent concentration. Preferably, the form of the heat exchanger surfaces should be copied or else the zeolite form will be pressed or else bonded to the heat exchanger surface. In order to keep the pressure loss of the incoming and outgoing steam (water vapor) as low as possible, suitable flow channels should be provided.

In contrast to other solid sorption substances zeolites do not swell up during adsorption. This allows the heat exchanging device to be firmly embedded into the zeolite body. Thus, the zeolite and heat exhanging device form a solid and stable body with no vacuum-tight sheeting being required. It is only necessary that heat exchanger and boiler adsorber walls enclose the zeolite blocked vacuum-tightly. External overpressure, i.e. atmospheric pressure, can then press the heat exchanging device tightly onto the zeolite and thus further improve the heat transfer. In addition, the combination of zeolite and water has the special advantage of being completely non-toxic and not inflammable. Compared with steel sheeting it shows no corrosion. As long as the temperature of the useful heat remains below 100° C., the entire unit will be under vacuum. Expensive pressure vessels, alarm systems and excess-pressure protection are not required. In order to obtain a higher performance figure, the super-heated work medium vapors from the boiler adsorber must be passing over sorption medium sections which are not directly heated up with primary energy and are, therefore, cooler prior to passing the shut-off device. In this manner the work medium vapors cool down while the sorption medium is being degassed. The result will be noticeably higher performance figures.

It is also contemplated that the vapor chamber 14 be part of the boiler adsorber 10 and, via liquid slide valves 18,19 can be blocked off from the evaporation unit 30 and from which the liquid brine can be emptied. Thus, it is advantageous that expensive and voluminous steam shut-off devices or valves are not required. The liquid slide valves at the vapor chamber can, in addition, be economically designed as check valves or else as float valves.

It is also contemplated that a liquid brine flow controller 37 be provided to control the liquid brine flow through the vapor chamber 14. This liquid brine flow controller is especially advantageous in that charging of heat from the heat source can take place completely independently from the delivery/discharge of useful heat. For the effective performance figure only, the temperature of the heat source at the end of the sorption phase is decisive, not the temperatures prior to this phase. Therefore, large temperature fluctuations at the heat source do not have any influence on the instantaneous thermal efficiency of the temperature of the useful heat. A sudden temperature rise in the liquid brine and a pressure rise in the work medium, i.e. by incoming hot waste water from a cooling process, only actuates the liquid brine flow controller.

It is also contemplated that at least one heat exchanger 39 be provided in the brine circulation 35. The split-design of the evaporation unit into a vapor chamber in which the actual evaporation takes place and into at least one heat-absorbing heat exchanger unit has the advantage of short work medium vapor ways without any restrictions as to the selection of the heat source used. At least one heat exchanger can always be installed near the heat source or take over the functions of a heat collector itself (solar-absorber, absorber-roof, etc.). Thus, in case ambient air is used as heat source it is not necessary to lead it over voluminous and energy consuming wind tunnels to the evaporator.

It is also contemplated that the liquid brine be a mixture of liquid work medium and an additive which reduces the freezing (solidification) point. This makes possible the charging of heat into the sorption unit even at heat source temperatures below 0° C. It is also contemplated that the mixture contain a salt or base, the cations of which are identical with the cations of the zeolite. In this manner, on one hand an extremely low vapor pressure for the admixed medium is provided and, on the other hand, a uniformity of the metal cations in the zeolite and in the liquid brine. So in case the liquid brine comes in contact with the zeolite, there will be no harmful ion exchange.

Another objective is to provide a branch pipe section 33 with a shut-off device in the brine circulation 35 in which at least part of the liquid brine can be stored, the branch pipe section controlling the work medium concentration of the liquid brine and being filled up to maximum with liquid brine, at temperatures above the freezing/solidification point of the pure work medium and being almost completely empty at the lowest liquid brine temperatures. This is advantageous in that the evaporation pressure in the vapor chamber at temperatures above freezing (solidification) point will not unnecessarily be further reduced by too high a concentration of anti-freeze agent. A portion of the liquid brine is stored in a branch pipe section with shut-off device of the liquid brine circulation system, while liquid work medium from the storage tank is being added to the brine circulation system via the refilling device. Also, in the same manner the work medium evaporating in the vapor chamber will be replaced through a refilling device 34 for liquid work medium in the brine circulation 35. By providing a heat exchanger 46 in the work medium line between storage tank 21 and refilling device 34, an additional improvement of the performance figure can be reached. The liquid work medium is cooled in a heat exchanger prior to feeding it into the refilling device, i.e. for hot-water preparation. Furthermore, by installing at least one heat exchanger 46 in the vapor section of the vapor chamber 14, an even more favorable improved performance figure is achieved. The heat from the liquid work medium is transferred onto the cold work medium vapor inside the vapor chamber itself. Then the vapors do not unnecessarily take their required portion of specific heat from the useful heat available in that section.

It is also contemplated that the heat exchanger unit 11 and vapor chamber 14 be designed and arranged so that the boiler adsorber 10 first cools down in the area/section of the vapor chamber 14, and/or that the work medium vapors generated inside the vapor chamber 14 pass first over already cooled down sections of sorption medium. This makes it possible to pass the work medium vapors generated inside the vapor chamber prior to absorption over sorption medium sections which under the prevailing operating conditions are already saturated, however, they will be cooled down further by the colder work medium vapors and continue sorbing. Therefore, it is not only possible to generate the heat quantity required to super heat the work medium vapors in an energetically favorable way, but also to improve the heat transfer from the sorption medium to the heat exchanger unit by by-passing vapors besides diminishing temperature differences.

It is also contemplated that a water jet pump 22 be connected to condenser 20. This is advantageous in that the entire sorption unit can be pumped empty with the water jet pump. Disturbing gases, which hinder the adsorption of work medium vapors by the sorption medium, will be entrained and compressed by the work medium vapors entering the condenser. The condenser temperature is here, contrary to the one of refrigeration machines which discharge their waste heat at lower temperatures and pressures, still high enough to allow a removal of the disturbing gases with the water jet pump.

It is also an objective to provide a metal plate which is pressed vacuum tightly against an opening in the boiler adsorber wall by atmospheric pressure. In case of excess pressure inside the boiler adsorber, the metal plate acts as an excess pressure relief valve. The opening (in the boiler adsorber wall) can advantageously also be used for boiler adsorber filling and inspection.

During the desorption phase in the present system, it is possible to transmit useful heat from the specific heat of the sorption medium 12 through the heat exchanger unit 11. In this manner, the heating efficiency of the useful heat becomes independent of the heating efficiency of the desorption heat. This can also be done during the sorption phase so that in case heat is not available from the heat source, the supply of useful heat is still guaranteed.

It is also possible with the present system to store heat from the heat source as specific heat of the sorption medium 12. If an oversupply of heat from the heat source was available, the excess heat can be stored immediately at the temperature of the useful heat. Also, prior to or during the desorption phase, a heat discharge controller 41 can let heat exchange medium flow back from the heat exchanger unit 11. This further improves the performance figure because the heat exchange medium is not unnecessarily being evaporated by the desorption heat.

Also, at the end of the desorption phase, with the shut-off device 13 closed, work medium vapors from the boiler adsorber 10 can flow into the boiler adsorber 10a via the blockable work medium vapor line 44. With this in mind, at the end of the desorption phase or at the beginning of the cooling down phase, the work medium can be condensed in the liquid brine and the heat quantity removed from the boiler adsorber 10 will be transmitted to the boiler adsorber 10a through the evaporation unit 30. These factors result in a wider degassing range and thus a higher performance figure. This indirectly also increases the storage capacity because despite an identical desorption heat consumption the quantity of useful heat is increasing. An alternative is to not add the desorption heat at the end of the desorption phase so that the temperature of the sorption medium is being reduced while simultaneously the degassing range is widening. Heat losses through the insulation layer are considerably reduced. Hence a thinner insulation layer can be applied, which reduces investment cost and space requirements as well. This specific advantage is also gained by permitting the work medium vapors generated in the heat exchanger unit 11 to flow over the blockable work medium vapor line 42 into the boiler adsorber 10a and be sorbed there. The sorption medium is cooled down but in addition, the sorption medium can adsorb more work medium at the same work medium vapor pressure and thus increase the quantity of useful heat generated.

Alternatively, the vapor line from the heat exchanger 11 to the condenser 20 can be blocked which produces a different process from that immediately described above insofar as here also the sorption medium temperature can drop far below the temperature of the useful heat. The well known principle of two-stage operation can here be reached with most simple means. By this method the temperature of the heat from the heat source will be brought up to the level of the useful heat temperature in two temperature rising steps. Contrary to the known processes, by this method the storage capacity and performance figure are also noticeably increasing and not decreasing.

This method can be expanded to a multi-stage operation by separating heat exchanger unit 11a from condenser 20 and having the work medium vapor flow from unit 11a into a second boiler adsorber unit where it is being adsorbed.

A further modification of the system is to permit the work medium vapor coming from heat exchanger unit 11 to enter into heat exchanger unit 11a and still be super heated. This results in an increase of the performance figure because the transmitted heat quantities are part of the desorption heat.

Also provided for is the possibility of heating the brine circulation 35 by low-tariff electrical power during the sorption phase. This is in the form of an additional electrical backup heating system used during low-tariff periods and the useful heat quantity thus available is then only being increased by the mere sorption heat quantity.

The system also provides for utilization of this mere sorption heat quantity without any electrical backup heating. This is accomplished by having the work medium vapor from heat exchanger unit 11 flow into boiler adsorber 10 through the open shut-off device 13 where it is being sorbed by the sorption medium 12. The operating cost for sorption units can be reduced further by taking not only advantage of the night-tariff periods (as described earlier) but also of other low-tariff/low-load periods of power plants, i.e. weekend-tariffs which might be more economical since this type of unit does not have any peak power requirements and power plants working of base-load operation can also be kept on line on weekends. Despite a higher power demand, new power plants will not be required. Pitcoal power plants can also be kept on line on weekends and help substitute for heating systems that normally use fuel oil as feed stock.

A further modification involves the cooling down in chronological order of boiler adsorber units 10 and 10a, one after the other. It is possible to start the sorption phase (cooling process) or else to take available heat from the heat source at an earlier stage, after the desorption phase, in case a boiler adsorber unit had not been kept on stand-by. Effective/useable waste heat will not be lost.

Another special advantage of the present system is the fact that heat from a heat source can be charged into the system independently of the prevailing operating conditions/phases of the sorption unit. Thus, if $P_S < P_A$, the liquid brine flow controller 37 sends the liquid brine through the vapor chamber 14. This allows the utilization of all types of waste heat from industrial plants, trade establishments and houehold without intermediate heat storage even with considerably fluctuating temperatures. Also the waste heat from waste material combustion furnaces can be used profitably. Another possible heat source, which has not yet been used, is the automobile. The specific heat of the hot motor block can be transmitted without extensive additional investments to the sorption unit via the cooling water circulation. For this, after having just used the automobile for driving, it will be connected to a heat exchanger of the evaporator unit with a snap coupling.

With the present system the consumer can also either take useful heat from the condenser or return excess heat to the brine circulation. This will be accomplished by supplying brine circuit 35 with heat from the consumer 50 during the sorption phase. This way, the heating system of the consumer will become a cooling system. This means that during summertimes, and if the condenser is being by-passed, rooms can be cooled with the same radiators that are used for heating during winter periods. Thus, a conventional heating system can be changed into a cooling system with only a few additional investments. The heat discharged by the condenser can then be used profitably, i.e. to heat up a swimming pool. If the condenser is not being by-passed and the cooling effect is not being used, the same advantages can be expected as when the work medium vapor from the heat exchanger unit 11 flows into the boiler adsorber 10 through the open shut-off device 13 where it is being sorbed by the sorption medium 12.

It is also contemplated that if $P_S > P_A$, the liquid brine flow controller 37 can send the liquid brine through the vapor chamber 14, the vapor chamber will be transformed into a condenser because work medium from the sorption medium condenses into the liquid brine and warms it up. Over the brine circulation system, heating and cooling are possible. The heat removed from the liquid brine inside vapor chamber 14 can be stored outside the evaporation unit 30 in an underground collector, icehouse, etc.

It is also possible with the present system to reach a single-step temperature increase of more than 100° C. in a unit. This makes it possible to provide in one process step simultaneously either ice or hot water, or at different times. This is accomplished by having the temperature of the useful heat over 100° C. during the sorption phase and the evaporation temperature inside the vapor chamber 14 below 0° C.

If the desorption heat in the present system is generated by the combustion of solid, liquid or gaseous materials/fuels, the sorption unit can be used to utilize the waste heat from solid waste combustion (i.e. wood, straw, paper, wastes, etc.). The total operating time of the burners can, under these provisions, be reduced to ¼ of the normally required burner operating time. A combustion furnace for solid materials need only be refilled once/day or week whereas the combustion period must not be interrupted. During furnace shut-down, the sorption unit takes over the useful heat supply. If the useful heat demand does not rise (during the combustion period), the burner efficiency approximately triples. Therefore, even for minimum heat output, larger burners can be installed which operate at a higher efficiency rate and have a reduced emission of harmful materials. Also, open fireplaces and tile stoves can thus effectively be connected to sorption units.

The processes and methods of the present system can in principle all be combined in any desired order.

With the above objectives among others in mind, references made to the attached drawings.

DETAILED DESCRIPTION OF THE DRAWINGS

Figure 1A:
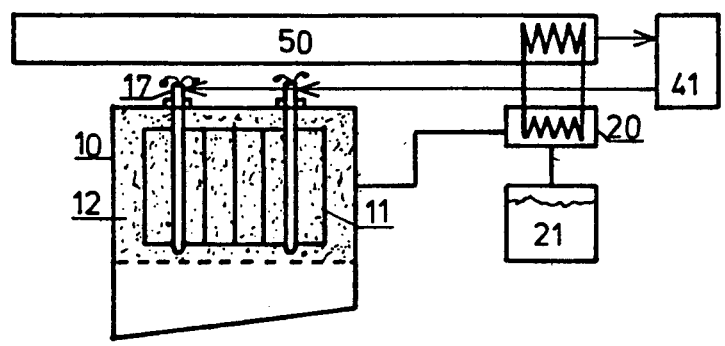
FIG. 1a–c is a schematic block diagram showing the three consecutive operating phases of the sorption unit.
Figure 1B:
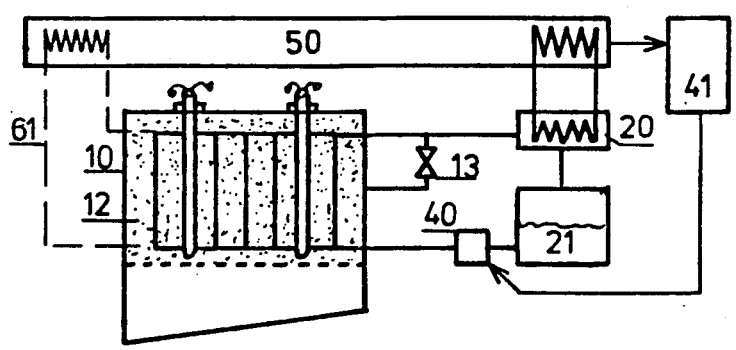
Figure 1C:
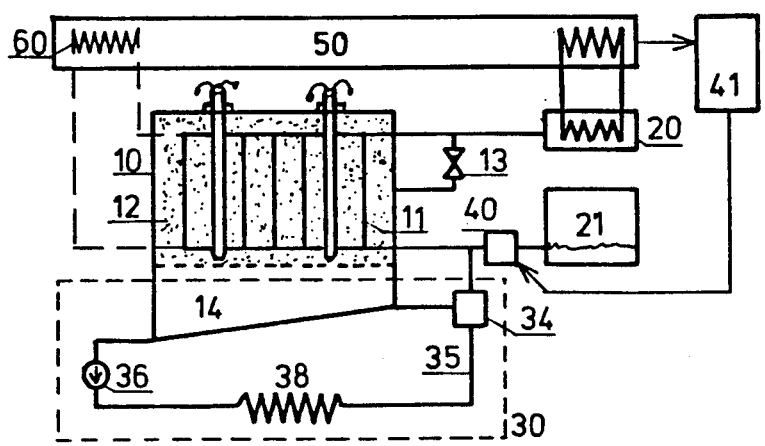

FIG. 1c shows the basic arrangement of the specific sorption unit of the invention. In the upper section of a conventional boiler adsorber 10 is sorption medium 12 and a heat exchanging device 11. A vapor chamber 14 of the present invention is in the lower section of the conventional boiler adsorber 10 and the vapor chamber 14 is also a part of the evaporation unit 30. Evaporation unit 30 is actually a conventional circulation evaporator type with a separate vapor chamber 14 and a heat exchanger 38. From here, useful heat can also be supplied to a consumer 50.

A heat discharge controller 41 which actuates the operating/controlling device/element 40 monitors the heat transmission to the condenser 20 completely independently of the operation conditions of the boiler adsorber 10. An additional shut-off device 13 is provided over which heat from a heat source can be charged into the boiler adsorber 10 via the heat exchanger 38 also during the sorption phase. An additional transfer point 60 at the consumer 50, shown as a dotted line in FIG. 1c, is therefore not necessary. For the operation of the sorption unit, a storage tank 21, a refilling device 34, and a brine pump 36 are also provided.

In order to simplify operation of the system depicted in schematic form 1a–1c, only the absolutely necessary equipment parts are depicted for each respective operating step, or having been used during the three consecutive operating phases, starting with the desorption phase, 1a.

The three operating phases of the sorption unit are as follows (FIG. 1):

1. Desorption Phase (FIG. 1a)

During this phase the work medium is expelled from the sorption medium 12 by a supply of desorption heat at high temperatures and then condensed in the condenser 20 at the temperature of the useful heat. The condensed work medium will then be stored in the storage tank 21. As soon as the final temperature of the sorption medium has been reached, the desorption heat supply will be interrupted. During this phase, the useful heat will be transmitted to the consumer 50 via the condenser 20.

2. Cooling Down Phase (FIG. 1b)

Through heat exchangers 11, the stored specific heat of the sorption medium 12 will be discharged to the consumer. This will be done either via the heat exchange circulation 61, as shown in dotted lines, or, again by way of the condenser 20. The heat discharge controller 41 monitors the evaporation pressure of the work medium in the heat exchanger unit 11 over the operating/controlling device/element 40. The sorption medium 12 will cool down and reduce the work medium vapor pressure in the boiler adsorber 10 to a value below the pressure inside the condenser 20 at the beginning of this process.

3. Sorption Phase (FIG. 1c)

As soon as the work medium vapor pressure in the boiler adsorber 10 drops below the work medium vapor pressure in the evaporator 30, the sorption phase begins. Work medium from the brine circulation 35 evaporates in the vapor chamber 14 at low temperatures and flows into the sorption medium 12 where it is being sorbed at higher temperatures and thereby sets its sorption heat free. The cooled down liquid brine will be warmed up again in heat exchanger 38 and then supplied again to the vapor chamber 14. But prior to this the work medium, lost by evaporation in the vapor chamber 14 is replaced in the refilling device 34 from storage tank 21. During this phase the sorption heat is transmitted/supplied to the consumer 50 in the same manner as during the cooling down phase as described above.

Figure 2:
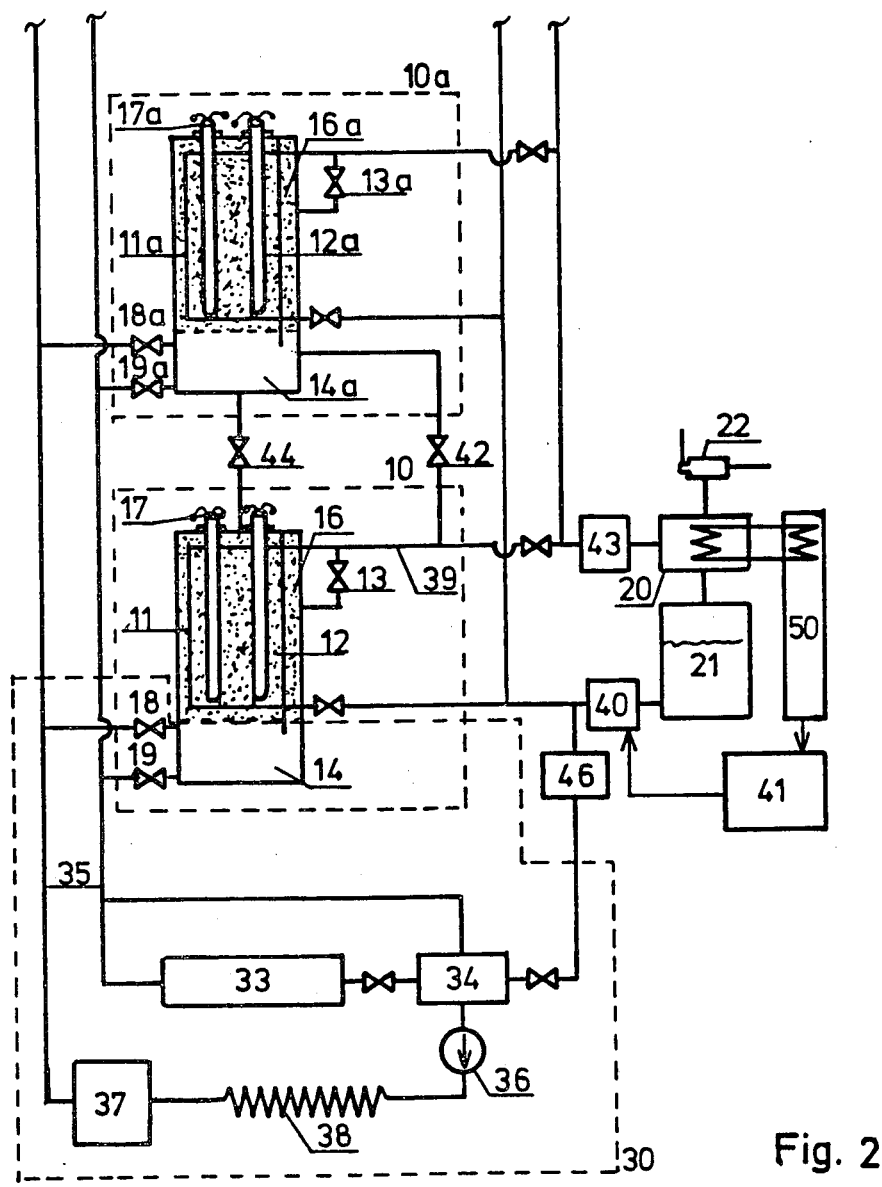
FIG. 2 is a schematic block diagram of a sorption unit with two boiler adsorber units.

Supplementary to FIG. 1c, FIG. 2 shows an arrangement where more than one boiler adsorber is installed. In this arrangement, the heat exchanger units 11, 11a are equipped with an electrical heating system 17, 17a. Only the sorption medium sections 16, 16a upstream of the shut-off devices 13, 13a will not be heated. The condenser 20 and a water jet pump 22 are installed on the heat discharge side upstream of the storage tank 21. On the bottom end of storage tank 21 the heat discharge controller 41 monitors the flow to the heat exchanger units 11, 11a via the operating/controlling device/element 40. From here a work medium line runs to the evaporation unit 30 which, includes a brine circulation 35 with a branch pipe section with shut-off device 33, refilling device 34 and the brine pump 36. This circulation is connected to the vapor chambers 14, 14a via the liquid flow valves 18, 18a and 19, 19a and the liquid brine flow controller 37. The two boiler adsorber units 10, 10a are connected over the two work medium vapor lines 42 and 44.

The sorption medium 12 is heated up by the electrical heating system 17 preferably during low-tariff periods. The work medium vapors are set free during this phase and will increase the pressure inside the boiler adsorber 10 so that it exceeds the condenser pressure. Now shut-off valve 13 will unblock the vapor line to condenser 20. During this desorption phase only work medium vapors are inside vapor chamber 14, because the liquid flow valves 18, 19 have interrupted the brine circulation 35. The work medium separated from the sorption medium 12, condensed in condenser 20 by supplying its heat to consumer 50, recollects in storage tank 21. Water jet pump 22 then removes the uncondensible gases from condenser 20.

At the end of the desorption phase, the shut-off valve 13 closes the line to the condenser. Then, heat discharge controller 41 fills liquid work medium from the storage tank, controlled by the heat consumer 50, into heat exchanger 11. Here the work medium evaporates cooling the sorption medium 12 down from bottom to top. The vapor pressure inside the boiler adsorber 10 then drops with the shut-off valve 13 still closed. As soon as this pressure has dropped below the evaporation pressure of the liquid brine, liquid flow valves 18 and 19 unblock brine circulation 35 through vapor chamber 14, controlled by liquid brine flow controller 37. Here the work medium evaporates and gives adsorption heat to the sorption medium 12 at a higher temperature or else discharges this heat to the condenser 20 by way of heat exchanger unit 11. If required, refilling device 34 replaces the water having evaporated inside the vapor chamber 14 by filling up brine circulation 35 from storage tank 21.

In order to further increase the storage capacity, sorption medium 12 will be cooled down below the effective temperature (of the useful heat), by separating the condenser 20 from heat exchanger unit 11 and feeding work medium vapors from heat exchanger unit 11 via the blockable work medium vapor line 42 into the boiler adsorber 10a. Because of the higher work medium vapor pressure, the adsorption medium 12a in the boiler adsorber 10a will continue sorbing and the heat thus being set free can be supplied, to the consumer 50 via the heat exchanger unit 11a. If during the sorption phase there is no possibility of charging heat from the heat source via the evaporator unit 30 into the system, this heat will be taken from the boiler adsorber 10 - heat exchanger system 11, by feeding a partial stream of the work medium vapor stream via shut-off valve 13 into the boiler adsorber 10 where it is being sorbed by the sorption medium.

I claim:

1. A sorption unit adapted to be simultaneously used as a heat pump and a heat reservoir comprising;
    at least one boiler adsorber 10 containing a sorption medium 12 for boiling out and sorbing a work medium,
    a heat exchanger 11 in the boiler adsorber 10 in communication with the sorption medium 12 for transmittal of stored specific heat from the sorption medium to the exterior of the boiler adsorber 10,
    a condenser 20 connected to the boiler adsorber 10 to receive work medium expelled from the sorption medium and to be condensed therein,
    a storage tank 21 connected to the condenser to receive condensed work medium,
    a controlling element for controlling the discharge of heat from the boiler adsorber 10 to a consumer 50, and
    the controlling element being a heat discharge controller 41 interconnected with the boiler adsorber 10 and the consumer 50 so as to be capable of monitoring pressure conditions in the boiler adsorber 10 and the intervals, temperature, and power output of the useful heat discharged.

2. The invention in accordance with claim 1 wherein an operating/controlling device/element 40 is interconnected with the heat discharge controller 41 and the boiler adsorber 10 to control the evaporation pressure of the heat exchange medium and the heat exchange medium is replaced by the work medium.

3. The invention in accordance with claim 2 wherein the vapor line 39 interconnects the heat exchanger unit 11 with the condenser 20, the vapor line including an additional heat exchanger 43, and a shut-off valve in the form of a check valve in the vapor line between boiler adsorber 10 and condenser 20.

4. The invention in accordance with claim 1 wherein there are two independently operated identical boiler adsorber units 10, 10a interconnected with a blockable work medium vapor line 44, heat exchanger unit 11 being interconnected with boiler adsorber unit 10a by means of a second blockable work-medium-vapor-line 42.

5. The invention in accordance with claim 1 wherein the sorption medium 12 is a zeolite of the Na-Y type.

6. The invention in accordance with claim 1 wherein the sorption medium 12 is at least partially a zeolite of the Na-A type that has undergone an ion exchange with magnesium ions, the zeolite including less than 18 wt. % bonding agent or by-products produced by transformation, and the zeolite being formed into a solid body with flow channels therein and/or its surfaces having been geometrically formed to match the heat exchanging device surfaces 11, and at least one of the heat exchanger unit 11 and the walls of the boiler adsorber being pressed tightly onto the zeolite by atmospheric pressure.

7. The invention in accordance with claim 1 wherein an evaporation unit 30 is interconnected with the boiler adsorber 10 and includes a vapor chamber 14 as part of the boiler adsorber 10, liquid slide valves 18, 19 interconnecting the vapor chamber 14 with the evaporation unit 30 when opened and when closed blocking off the passageway between the vapor chamber 14 and the evaporation unit 30, and permitting liquid brine to be emptied from the vapor chamber 14.

8. The invention in accordance with claim 7 wherein the liquid brine flow through the vapor chamber 14 is controlled by a liquid brine flow controller 37 capable of comparing the work medium vapor chamber of the brine circulation 35 $P_a$, with the work medium vapor pressure inside the boiler adsorber 10 $P_s$.

9. The invention in accordance with claim 7 wherein the brine circulation 35 includes at least one heat exchanger 39 and a refilling device 34 for liquid work medium, the liquid brine being a mixture of liquid work medium and an additive which reduces the freezing (solidification) point, and the mixture containing a salt or base, the cations of which are identical with the cations of the zeolite.

10. The invention in accordance with claim 9 wherein the brine circulation 35 includes a branch pipe section 33 in which at least part of the liquid brine can be stored and having a shut-off device in order to control the work medium concentration of the liquid brine.

11. The invention in accordance with claim 9 wherein a work medium line interconnects the storage tank 21 and refilling device 34, and at least one heat exchanger 46 in the work medium line and installed in the vapor section of the vapor chamber 14.

12. The invention in accordance with claim 1 wherein a water jet pump 22 is connected to condenser 20.

13. The invention in accordance with claim 1 wherein the sorption unit is operated with one desorption phase, one cooling-down phase, and one sorption phase, useful heat taken from the condenser 20 during the desorption phase while useful heat from the specific heat of the sorption medium is transmitted through the heat exchanger unit 11, and prior to or during the desorption phase the heat discharge controller 41 lets heat exchange medium flow back from the heat exchanger unit 11 while at the end of the desorption phase with the shut-off device 13 closed, work medium vapors from the boiler adsorber 10 flow into the boiler adsorber 10a via a blockable work medium vapor line 44 with the desorption heat not being added.

14. The invention in accordance with claim 1 wherein the sorption unit is operable so that during the sorption phase, useful heat from the specific heat of the sorption medium 12 is transmitted through heat exchanger unit 11 and heat from the heat source is stored as specific heat of the sorption medium 12.

15. The invention in accordance with claim 4 wherein work medium vapors generated in heat exchanger unit 11 flow over blockable work medium vapor line 42 into boiler adsorber 10a and is sorbed therein, the vapor line from heat exchanger 11 to condenser 20 being blocked, and the heat exchanger unit 11a being separated from condenser 20 so that the work medium vapor from unit 11a flows into a second boiler adsorber unit where it is being adsorbed.

16. The invention in accordance with claim 7 wherein low-tariff electric power means is provided to heat the brine circulation 35 during the sorption phase.

17. The invention in accordance with claim 8 wherein if $P_s < P_a$, the liquid brine flow controller 37 sends the liquid brine through the vapor chamber 14, and during the sorption phase the brine circuit 35 will be supplied with heat from the consumer 50.

18. The invention in accordance with claim 8 wherein if $P_s > P_a$, the liquid brine flow controller 37 sends the liquid brine through the vapor chamber 14, and with the heat removed from the liquid brine inside vapor chamber 14 at least one heat exchanger 38 will be de-iced and the heat will be stored outside the evaporation unit 30, and that at the end of the desorption phase or at the beginning of the cooling down phase, the work medium will be condensed in the liquid brine, and the heat quantity removed from the boiler adsorber 10 is transmitted to the boiler adsorber 10a through evaporation unit 30.

19. The invention in accordance with claim 18 wherein the heat removed from the liquid brine inside the vapor chamber 14 is stored outside the evaporation unit 30, and the heat quantity removed from the boiler adsorber 10 is transmitted to boiler adsorber 10a through evaporation unit 30.

20. The invention in accordance with claim 13 wherein the temperature of the useful heat is over 100° C. during the sorption phase and the evaporation temperature inside the vapor chamber 14 is below 0° C.

* * * * *